United States Patent [19]

Walter et al.

[11] 4,433,875
[45] Feb. 28, 1984

[54] TORQUE TRANSMITTING BEARING AND METHOD OF ASSEMBLY

[75] Inventors: Lothar Walter, Schweinfurt; Manfred Brandenstein, Eussenheim; Horst M. Ernst, Eltingshausen; Armin Olschewski, Schweinfurt, all of Fed. Rep. of Germany

[73] Assignee: SKF Kugellagerfabriken GmbH, Schweinfurt, Fed. Rep. of Germany

[21] Appl. No.: 408,440

[22] Filed: Aug. 16, 1982

[30] Foreign Application Priority Data

Aug. 17, 1981 [DE] Fed. Rep. of Germany ... 8124026[U]

[51] Int. Cl.³ .............................................. F16C 29/04
[52] U.S. Cl. ..................................... 308/6 R; 308/236
[58] Field of Search ............... 308/6 R, 6 A, 6 B, 6 C, 308/236, 216, 235; 29/148.4 A

[56] References Cited

U.S. PATENT DOCUMENTS

| | | |
|---|---|---|
| 2,670,242 | 2/1954 | Beckman ..................... 308/184 R X |
| 2,779,641 | 1/1957 | Sutowski ......................... 308/236 X |
| 3,052,956 | 9/1962 | Daugherty ...................... 308/236 X |
| 3,197,243 | 7/1965 | Brenneke .......................... 308/236 X |
| 4,025,995 | 5/1977 | Thomson ........................ 308/216 X |
| 4,082,374 | 4/1978 | Ernst et al. .......................... 308/6 C |

Primary Examiner—Stuart S. Levy
Assistant Examiner—David Werner
Attorney, Agent, or Firm—Eugene E. Renz, Jr.

[57] ABSTRACT

Torque transmitting bearing assembly for longitudinal movements with a shaft (1) supported axially slidable by means of a roller bearing in a housing (2) whereby the roller bearing is provided with at least one bearing race plate (3) which is arranged radially adjustable by means of a corresponding row of balls (4) against a bearing race groove (5) running axially in the shaft (1) and which can be fixed to the housing (2), characterized in that the outside of the radially adjustable bearing race plate (3) facing the bore surface (7) of the housing (2) is provided with at least one projection having a knife-like edge (6) or the like which penetrates into the bore surface (7).

3 Claims, 5 Drawing Figures

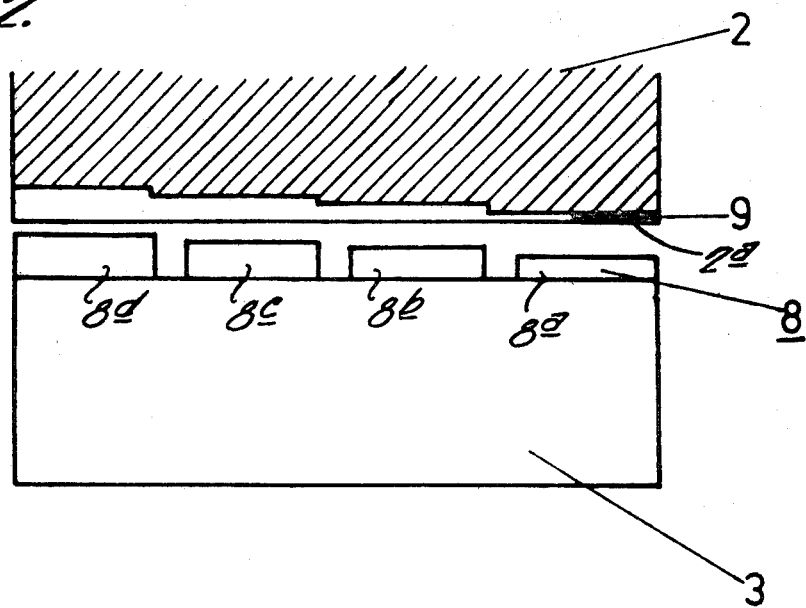

TORQUE TRANSMITTING BEARING AND METHOD OF ASSEMBLY

BACKGROUND AND SUMMARY OF THE INVENTION

The present invention relates to a torque transmitting mechanism for members adapted for a longitudinal movement relative to one another.

The invention relates particularly to a torque transmitting bearing assembly incorporating a shaft supported for axial sliding movement relative to a housing by means of a roller bearing wherein the roller bearing is provided with at least one bearing race plate which is mounted for radial adjustment by means of a corresponding row of balls against a bearing race groove running axially in the shaft and which can be fixed to the housing. The bearing race plate has axially running sharp edge segments which penetrate the bore surface of the housing when the bearing is pressed in place. By this process the bearing race plate may be aligned accurately with the bearing race of the shaft.

Bearing applications of this type are previously known from German Preliminary Application No. 2,849,758. In accordance with the assembly shown in this publication, a convex conical or truncated conical surface is machined in the bearing race plate and a complementary but concave constructed conical or truncated conical surface is arranged on the front side of a housing screw. By adjusting the bearing race plate by means of the housing screw, the bearing race plate is fixed axially and in a peripheral direction by means of the coacting conical surfaces. By this arrangement, the assembly is capable of transmitting torque. The mating conical surfaces, however, produce a predetermined form fit contact and thus, if there is a slight variation in the finishing tolerances, a tilting or offset of the bearing race plate can be anticipated especially when the housing screw is not aligned with the center line of the bearing race plate or with the bearing race groove or the shaft. This offset alignment may produce undesirable play or poor running properties and result in premature failure. These defects are particularly disadvantageous when two bearing race plates are to be used in the assembly for the transmission of torque. In these instances, a uniform distribution of the torque to both bearing race plates is only seldom possible since in the case of plural plates all individual parts must be produced and installed without any tolerance leeway. In practice this is, however, not feasible. Furthermore, the housing must be of a substantial wall thickness in order to machine threads for the housing screw. Additionally, the housing screw must be easily accessible from the outside in order to make any adjustments at all and in some applications, the space requirements do not allow this. In summary, these prior arrangements are not expedient since threads and corresponding housing screws must always be provided in the housing.

With the foregoing in mind, it is an object of the present invention to provide a simple and inexpensive means for adjusting and fixing the torque transmitting bearing race plate in a torque transmitting bearing assembly of the above type without the need for special provisions in the housing. To this end, the outer periphery of the radially adjustable bearing race plate confronting the bore surface of the housing is provided with sharp projections in the form of a knife edge or the like which when inserted into the bore penetrates the bore surface. The knife edges preferably extend in a longitudinal direction so that the parts may be assembled by a telescoping assembly action.

The knife-like edges of the race plate projections are of a predetermined suitable height so that they project only slightly radially over the outside surface of the entire roller bearing for longitudinal movements. During installation, the roller bearing with the shaft is only pressed into the bore of the housing provided for this purpose. The sharp knife-like edges of the race plate penetrate the bore surface whereby pressure is applied through the row of balls on the bearing race groove of the shaft and consequently the bearing race plate is automatically aligned into its ideal operating position. After having been pressed in place in this fashion, the bearing race plate is fixed radially and in a peripheral direction and is capable of transmitting torque in both directions. Since the bearing race plate conforms closely and uniformly to the row of rolling elements for example, balls, which in turn conform to the bearing race of the shaft as the result of the radial force produced when being pressed into the bore, the bearing race plate cannot be tilted and offset. Two torque transmitting bearing race plates may be utilized which provide special advantages. For example, as the result of the automatic no-play alignment of the bearing race plates during assembly of the roller bearing, a uniform distribution of the torque on both bearing race plates is also obtained. Further, because of the shape and dimensions of the knife-like edges, the level of pretension of the appropriate rows of balls can be determined. Further, if only a slight pretension or no pretension or preloading is desired, assembling shafts may be used optionally, the bearing race depth of which are somewhat less than in the shaft to be used later.

In accordance with the present invention, the wall thickness of the housing may also be made very small or narrow since neither a thread nor any devices for fixing the torque transmitting bearing race plate is required. Additionally, it is not necessary to provide any adjustment means from outside of the housing so that this space which is required in some prior assemblies can be used for other more useful purposes. This is especially significant when the assembly is located in a difficult to reach place or when the housing mounts other drive mechanisms such as gears, couplings or the like. A further advantage is that the user of roller bearings for longitudinal movement applications does not need to provide anything in the housing except the bore. This is especially important since many errors may be made particularly during assembly which severely affect the running properties of the unit.

In accordance with another feature of the present invention, the knife-like projections on the bearing race plate may be formed as a plurality of discrete interrupted sections in the longitudinal direction, each section being of progressively greater radial height from one end of the race plate to the other end. During assembly of the roller bearing in the bore of the housing, the end with the knife-like edge projections of the least height are inserted first and upon continued telescopic movement of the assembly into the bore of the housing, the sections with the progressively greater projection heights follow in the same line and in the groove already formed by the previous section. By this arrangement each section penetrates and cuts away an additional amount of material and penetrates deeper into the bore surface of the housing. In this manner, it is possible to obtain substantially equal preloading or uniform load pretension or preloading or uniform load distribution over the entire length of the bearing race plate. Additionally as the result of the stepped configuration, a major portion of the knife-like projections penetrate deeper into the bore surface to provide greater torque transmitting capability of the entire assembly.

In accordance with still another feature of the present invention, the knife-like projections instead of being oriented in a straight longitudinal line on the outer periphery of the bearing race plate, may be arranged in a random pattern comprising distributed points or short sections of knife-like projections and each point or section when pressed into the bore of the housing individually penetrates into a still untouched section of the bore surface. This arrangement tends to balance the preloading or tension more uniformly over the entire length of the bearing race plate.

BRIEF DESCRIPTION OF THE DRAWINGS

These and other objects of the present invention and the various features and details of the operation and construction thereof are hereinafter more fully set forth with reference to the accompanying drawings, wherein;

FIG. 2 shows a bearing race plate with knife-like projections arranged in sections of stepped configuration;

DESCRIPTION OF THE PREFERRED EMBODIMENTS

Figure 1:
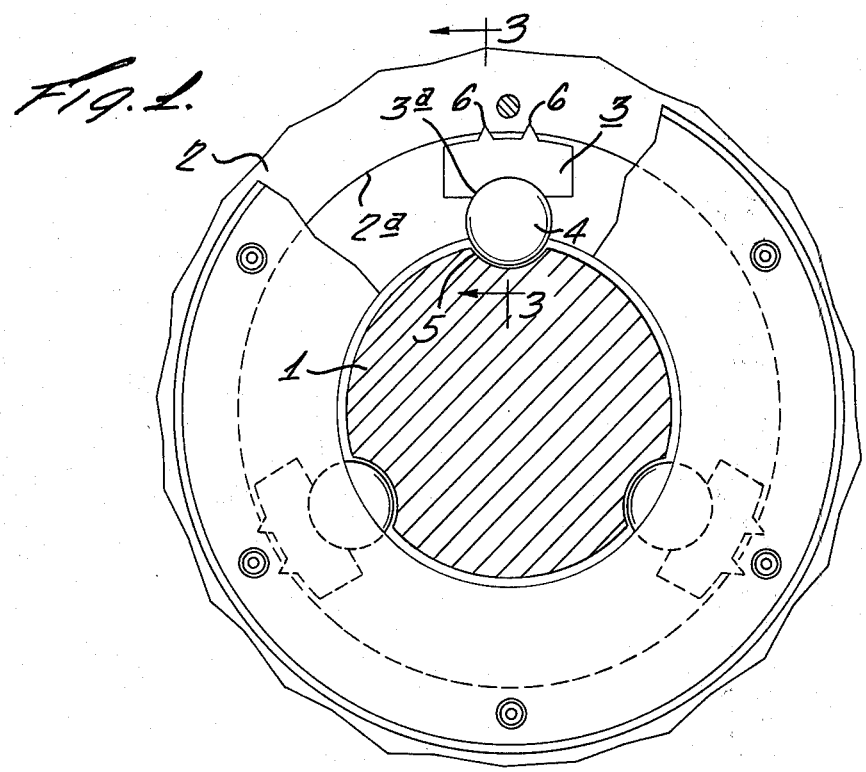
FIG. 1 is a transverse sectional view showing a torque transmitting assembly in accordance with the present invention.
Figure 3:
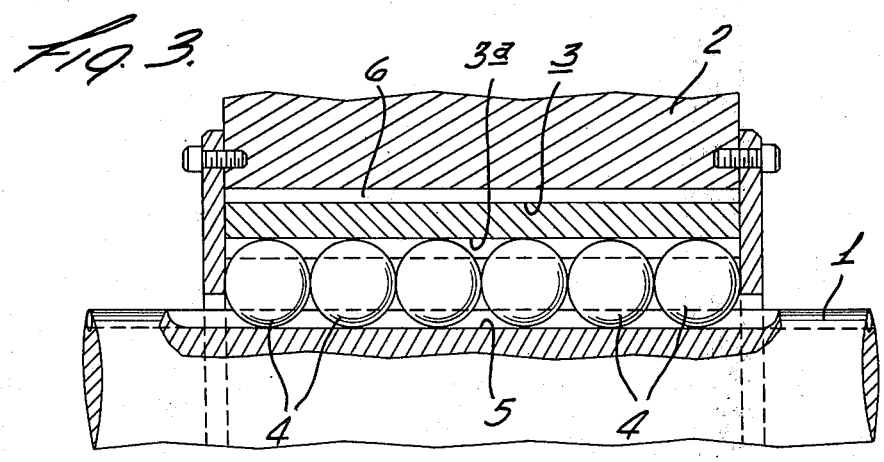
FIG. 3 is a sectional view taken on lines 3—3 of FIG. 1.

Referring now to the drawings and particularly to FIG. 1 thereof, there is illustrated an assembly comprising machine elements which are capable of longitudinal movement relative to one another and also of transmitting torque which incorporates a bearing arrangement. The assembly comprises in the present instance an elongated shaft 1, a housing 2 having a bore 2a circumscribing the shaft and spaced therefrom and a ball bearing arrangement comprising in the present instance a series of circumferentially spaced rows of balls 4 engaging in the annular space between the shaft and a series of bearing race plates 3.

The ball bearing arrangement facilitates axial displacement of the shaft 1 relative to the housing or inversely an axial displacement of the housing 2 on the shaft 1. As illustrated, the balls engage in raceway grooves 5 and 3a formed in the shaft 1 and bearing race plate 3 respectively so that torque is transmitted through the shaft by means of the race groove 5, balls 4 and the bearing plate 3 to the housing. By this arrangement, a gear, for example, may be mounted on the housing which can be used for driving and additionally, the housing may be moved axially to engage and mesh with other drive gears simply by displacing the housing axially relative to the shaft. Even though the assembly illustrated utilizes a plurality of bearing race plates 3, it is possible to use one race plate 3.

In accordance with the present invention, the bearing race plates 3 are secured to the housing against rotational movement so that a torque can be transmitted in the manner described above. To that end, in accordance with the present invention, at least one projection is formed on the outer peripheral surface of the bearing race plate, the projection having a knife-like apex or edge 6 facing the bore surface of the housing 2 which penetrates into the bore surface of the housing when the ball bearing is pressed in. In the present instance, there are two longitudinally extending side-by-side projections which run continuously the length of the race plate. The parts are assembled in the following manner. The ball bearings are mounted on the shaft 1. Thereafter, the raceway plate is inserted in the space between the bore of the housing and the rolling elements. This is done by inserting it telescopically in a longitudinal direction and during this assembly process, the knife-like projections 6 dig into the bore surface of the housing and secure it in a position aligned with the race grooves of the shaft 1 and after it is pressed in, it is fixed in this ideal position. Annular ring-like end plates 14 secured at opposite ends of the housing may be utilized to hold the balls 4 in place. The plate 14 at one end may be secured in place after assembly of the race plates 3 in the manner described above. It is also possible to provide an annular member in the space between the housing and shaft configured to retain the balls 4 having ball return paths between adjacent race plates and having suitable recesses for inserting the race plates as described above.

There is illustrated in FIG. 2 a modification of the assembly described above. In this instance, the bearing race plate has a series of knife-like projections subdivided into a plurality of axially spaced aligned sections 8a, 8b, etc. As illustrated, the height or radial projection of the individual projection sections increases stepwise starting from one axial end of the bearing race plate to the opposite end. Accordingly, when a ball bearing for longitudinal movements is provided with a bearing race plate of this type, the end with the knife-like projections sections having the least height is first inserted into the housing bore. As a result, a groove 9 is formed in the bore having a depth corresponding to the first section of the knife-like projection 8a. The next section 8b has a slightly greater radial projection and thus with continued pressing of the race plate, the second section 8b causes an even deeper penetration into the bore surface 2a. The same applies to the other sections so that when the raceway plate is fully inserted into the housing, a groove 9 is formed therein which becomes deeper stepwise. As a result of the stepped configuration of the projections, a uniform load distribution is obtained over the entire length of the bearing race plate 3. There is illustrated in FIG. 4 a modification showing a bearing race plate 3' having a series of knife-like projections 10a–10d stepped outwardly in a diverging mode.

Figures 4, 5:
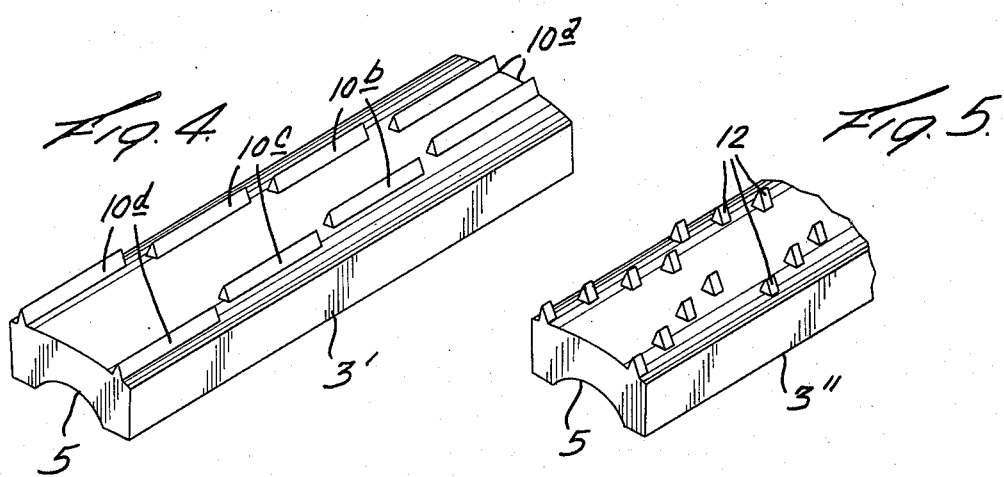
FIGS. 4 and 5 are perspective views of modified race plates in accordance with the present invention.

There is illustrated in FIG. 5 a further modification of a bearing race plate 3" in accordance with the present invention. In this instance, discrete knife-like projections 12 are provided in a random pattern so that each projection when pressed into the bore of the housing individually penetrates into a still untouched portion of the bore surface. By this arrangement, the pretension or preloading is substantially equal over the entire length of the bearing race plate.

Even though particular embodiments of the present invention have been illustrated and described herein, it is not intended to limit the invention and changes and modifications may be made therein within the scope of the following claims. For example, even though the assembly is shown in connection with a ball bearing, it is to be understood that the invention also has useful application to other bearing arrangements providing for longitudinal movement of machine elements, for example, rollers.

What is claimed is:

1. Torque transmitting bearing assembly comprising a shaft member mounted for axial movement in the bore of a housing, a plurality of rolling elements in the annular space between the shaft member and housing bore, said shaft member having an axially extending inner raceway groove for the rolling elements and a bearing race plate engageable between the rolling elements and the bore of the housing and having an axial groove defining the outer raceway for the rolling elements and at least a pair of radial projections disposed on opposite sides of a radial plane through the center of said axial groove and each projection having a longitudinally extending knife-like edge confronting the housing bore extending in the direction of said axial groove and engageable in the bore surface to align the bearing race plate and to fix the same in a radial and peripheral direction so that torque can be transmitted in either direction upon relative rotation of said shaft and housing, said projections comprising a plurality of sections longitudinally spaced apart, the sections increasing in radial height from one end of said plate to the opposite end thereof.

2. Torque transmitting bearing assembly comprising a shaft member mounted for axial movement in the bore of a housing, a plurality of rolling elements in the annular space between the shaft member and housing bore, said shaft member having an axially extending inner raceway groove for the rolling elements and a bearing race plate engageable between the rolling elements and the bore of the housing and having an axial groove defining the outer raceway for the rolling elements and at least a pair of radial projections disposed on opposite sides of a radial plane through the center of said axial groove and each projection having a longitudinally extending knife-like edge confronting the housing bore extending in the direction of said axial groove and engageable in the bore surface to align the bearing race plate and to fix the same in a radial and peripheral direction so that torque can be transmitted in either direction upon relative rotation of said shaft and housing, said projections comprising a plurality of sections spaced apart longitudinally and arranged in a series of pairs from one end of said plate to the other, each pair being spaced apart a progressively greater distance from said radial plane.

3. Torque transmitting bearing assembly comprising a shaft member mounted for axial movement in the bore of a housing, a plurality of rolling elements in the annular space between the shaft member and housing bore, said shaft member having an axially extending inner raceway groove for the rolling elements and a bearing race plate engageable between the rolling elements and the bore of the housing and having an axial groove defining the outer raceway for the rolling elements and a plurality of randomly oriented relatively short radial projections each having a longitudinally extending knife-like edge confronting the housing bore and engageable therein to align the bearing race plate and to fix the same in a radial and peripheral direction so that torque can be transmitted in either direction upon relative rotation of said shaft and housing, each projection compressed into the bore of the housing individually penetrating into an untouched portion of the bore surface.

* * * * *